United States Patent
Tanaka (10) Patent No.: US 11,585,769 B2
(45) Date of Patent: Feb. 21, 2023

(54) QUANTITATIVE ANALYSIS METHOD, QUANTITATIVE ANALYSIS PROGRAM, AND X-RAY FLUORESCENCE SPECTROMETER

(71) Applicant: Rigaku Corporation, Akishima (JP)

(72) Inventor: Shin Tanaka, Ibaraki (JP)

(73) Assignee: RIGAKU CORPORATION, Tokyo (JP)

(*) Notice: Subject to any disclaimer, the term of this patent is extended or adjusted under 35 U.S.C. 154(b) by 37 days.

(21) Appl. No.: 17/293,471

(22) PCT Filed: Jul. 10, 2020

(86) PCT No.: PCT/JP2020/027088
§ 371 (c)(1),
(2) Date: May 12, 2021

(87) PCT Pub. No.: WO2021/053941
PCT Pub. Date: Mar. 25, 2021

(65) Prior Publication Data
US 2022/0050068 A1 Feb. 17, 2022

(30) Foreign Application Priority Data
Sep. 20, 2019 (JP) .............................. JP2019-171559

(51) Int. Cl.
*G01N 23/223* (2006.01)
(52) U.S. Cl.
CPC .................. *G01N 23/223* (2013.01)
(58) Field of Classification Search
CPC .. C12Q 1/06; G01N 2223/076; G01N 23/223; G01N 33/50; G01N 33/52;
(Continued)

(56) References Cited

U.S. PATENT DOCUMENTS

| 5,418,826 A | 5/1995 | Sato et al. |
| 2012/0093286 A1 | 4/2012 | Peterson et al. |

FOREIGN PATENT DOCUMENTS

| CN | 1100886 A | 4/1995 |
| CN | 106383135 A | 2/2017 |

(Continued)

OTHER PUBLICATIONS

English translation of the International Search Report for PCT/JP2020/027088 dated Sep. 24, 2020, pp. 1-4.

(Continued)

*Primary Examiner* — Don K Wong
(74) *Attorney, Agent, or Firm* — HEA Law PLLC (57) ABSTRACT

A quantitative analysis method, which is performed by an X-ray fluorescence spectrometer, includes: a step of acquiring a plurality of spectra at least having a first peak at a first energy position from a sample containing a plurality of elements under different measurement conditions; a step of designating, from among the plurality of spectra, a primary spectrum and a secondary spectrum having a second peak at a second energy position; a first fitting step of performing a fitting on the first peak included in the secondary spectrum to calculate a background intensity at the second energy position due to the first peak; and a second fitting step of performing a fitting on the first peak of the primary spectrum and performing a fitting on the second peak of the secondary spectrum under a condition that the calculated background intensity is included at the second energy position.

5 Claims, 5 Drawing Sheets

(58) Field of Classification Search
CPC .......... G01N 23/2076; G01N 23/2209; G01N 2021/6417; G01N 21/6458; G01N 21/6486; G01N 21/6456
See application file for complete search history.

(56) References Cited

FOREIGN PATENT DOCUMENTS

| | | |
|---|---|---|
| EP | 3428629 A1 | 1/2019 |
| JP | H11160255 A | 6/1999 |
| JP | 3488918 B2 | 1/2004 |
| JP | 2014041065 A | 3/2014 |
| WO | 2012039130 A1 | 3/2012 |
| WO | WO-2017038702 A1 * 3/2017 .......... G01N 23/207 |

OTHER PUBLICATIONS

Search Report dated Oct. 5, 2022, for corresponding EP Patent Application No. 20866274.2, pp. 1-6.
Office Action dated Aug. 27, 2021, for corresponding CN Patent Application No. 202080005907.0 with partial English translation pp. 1-6.

* cited by examiner

SECONDARY SPECTRUM (b)

PRIMARY SPECTRUM

QUANTITATIVE ANALYSIS METHOD, QUANTITATIVE ANALYSIS PROGRAM, AND X-RAY FLUORESCENCE SPECTROMETER

CROSS REFERENCE TO RELATED APPLICATIONS

This application is a National Stage of International Application No. PCT/JP2020/027088 filed on Jul. 10, 2020, which claims priority from Japanese Patent Application 2019-171559, filed on Sep. 20, 2019. The contents of the above document is incorporated herein by reference in its entirety.

TECHNICAL FIELD

The present invention relates to a quantitative analysis method, a quantitative analysis program, and an X-ray fluorescence spectrometer.

BACKGROUND ART

An X-ray fluorescence spectrometry is a method of irradiating a sample with primary X-rays to analyze elements contained in the sample based on energy of emitted fluorescent X-rays. Specifically, the X-ray fluorescence spectrometer is configured to irradiate the sample with primary X-rays to acquire the emitted fluorescent X-rays as a spectrum having a width in an energy direction. When the elements contained in the sample and contents of the elements are known, it is possible to theoretically calculate a fluorescent X-ray intensity of fluorescent X-rays generated from the sample through use of a physical constant and an apparatus constant. This enables a theoretical profile to be calculated with the contents of the elements contained in the sample being used as parameters. As a result, contents of elements contained in an unknown sample can be quantitatively analyzed by determining the contents so that the theoretical profile best fits the spectrum acquired from the unknown sample. For example, in Patent Literature 1, there is disclosed a method of calculating a content of an element by fitting a spectrum acquired by a least squares method to a Gaussian function.

CITATION LIST

Patent Literature

[PTL 1] JP 11-160255 A

SUMMARY OF INVENTION

Technical Problem

In an actual case, depending on an element contained in a sample to be analyzed, measurement may be performed under measurement conditions in which excitation efficiency of fluorescent X-rays ascribable to the element is taken into consideration. For example, a type and an intensity of fluorescent X-rays that can be excited differ depending on a difference in primary X-rays to be applied. For that reason, the measurement may be performed under a plurality of measurement conditions determined based on respective elements contained in the sample, and a plurality of spectra are acquired under each measurement condition. The plurality of spectra including measurement results in an overlapping energy region may include the same X-ray fluorescence peak.

Figure 5:
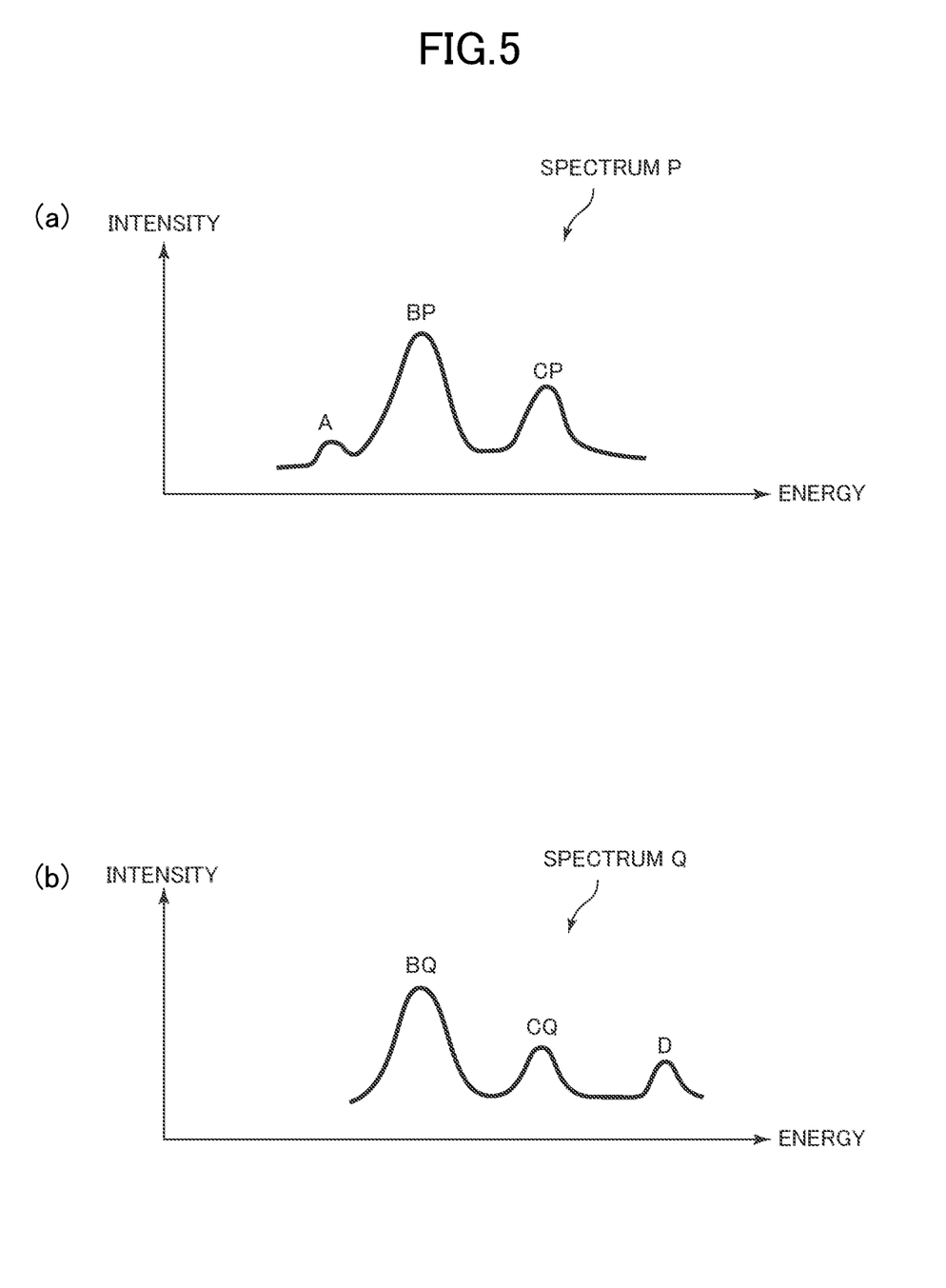
FIG. 5(a) and FIG. 5(b) are graphs for showing two spectra including the same X-ray fluorescence peaks.

For example, two spectra shown in FIG. 5(a) and FIG. 5(b) are a spectrum P and a spectrum Q acquired from the same sample under conditions of a measurement condition P and a measurement condition Q, respectively. FIG. 5(a) and FIG. 5(b) show spectra schematically indicating measurement results, and it is assumed that the sample contains elements A, B, C, and D. As shown in FIG. 5(a), the spectrum P includes a peak A ascribable to the element A, a peak BP ascribable to the element B, and a peak CP ascribable to the element C. Meanwhile, as shown in FIG. 5(b), the spectrum Q includes a peak BQ ascribable to the element B, a peak CQ ascribable to the element C, and a peak D ascribable to the element D. That is, the spectra P and Q include the same X-ray fluorescence peaks (BP and CP, and BQ and CQ).

Methods of calculating a content of each element contained in the sample based on the spectrum P and the spectrum Q include a method using all the peaks (peaks A, BP, CP, BQ, CQ, and D) included in the spectrum P and the spectrum Q, and a method using only peaks (peaks A, BQ, CQ and D) included in one of the spectra for the same X-ray fluorescence peaks.

In a case of calculating a theoretical profile, the contents of the elements B and C that can simultaneously fit the same X-ray fluorescence peaks (BP and CP, and BQ and CQ) included in the spectrum P and the spectrum Q are assumed to be determined when, for example, an apparatus constant to be used for fitting is an ideal value reflecting properties of the spectra. However, when types and forms of samples are different, an intensity ratio of the fluorescent X-rays included in the spectrum P and the spectrum Q may be different from the apparatus constant. In this case, it is difficult to calculate the contents that simultaneously fit the plurality of peaks (BP and CP, and BQ and CQ) ascribable to the same elements. Consequently, in the case of the method using all the peaks, it may not be possible to fit the peaks of any one of the spectra or the peaks of both.

Meanwhile, in the case of using only the peak included in one spectrum, fittings with respect to the peak BP and the peak CP are not performed. For that reason, an influence of a component at a tail of the peak BP and the peak CP, which is included in a background of the peak A, is not taken into consideration in the fitting, and an accurate analysis cannot be performed.

The present invention has been made in view of the above-mentioned problems, and has an object to provide a quantitative analysis method, a quantitative analysis program, and an X-ray fluorescence spectrometer, which are capable of performing a highly accurate quantitative analysis by taking an influence of a background into consideration when the same X-ray fluorescence peak is included in a plurality of spectra, and acquiring a theoretical profile that fits the X-ray fluorescence peak included in each spectrum.

Solution to Problem

According to claim 1, there is provided a quantitative analysis method, which is performed by an X-ray fluorescence spectrometer, the quantitative analysis method including: a step of acquiring a plurality of spectra at least having a first peak at a first energy position from a sample containing a plurality of elements under different measurement conditions; a step of designating, from among the plurality of spectra, a primary spectrum and a secondary spectrum having a second peak at a second energy position; a first fitting step of performing a fitting on the first peak included in the secondary spectrum to calculate a background intensity at the second energy position due to the first peak; and a second fitting step of performing a fitting on the first peak of the primary spectrum and performing a fitting on the second peak of the secondary spectrum under a condition that the calculated background intensity is included at the second energy position.

According to the quantitative analysis method of claim 2, in the quantitative analysis method according to claim 1, the plurality of elements include a first element that generates the first peak and a second element that generates the second peak, the first fitting step includes calculating a content of the first element and calculating the background intensity at the second energy position based on the content of the first element, and the second fitting step includes calculating a content at which a theoretical profile for the second peak of the secondary spectrum based on the calculated background intensity fits a spectrum of the second peak of the secondary spectrum and a theoretical profile for the first peak of the primary spectrum fits a spectrum of the first peak of the primary spectrum.

According to the quantitative analysis method of claim 3, in the quantitative analysis method according to claim 1 or 2, the primary spectrum further includes a third peak at a third energy position, and the second fitting step includes calculating a content at which a theoretical profile for the third peak of the primary spectrum fits a spectrum of the third peak of the primary spectrum.

According to claim 4, there is provided a quantitative analysis program to be executed by a computer used for an X-ray fluorescence spectrometer, the quantitative analysis program causing the computer to execute: a step of acquiring a plurality of spectra at least having a first peak at a first energy position from a sample containing a plurality of elements under different measurement conditions; a step of designating, from among the plurality of spectra, a primary spectrum and a secondary spectrum having a second peak at a second energy position; a first fitting step of performing a fitting on the first peak included in the secondary spectrum to calculate a background intensity at the second energy position due to the first peak; and a second fitting step of performing a fitting on the first peak of the primary spectrum and performing a fitting on the second peak of the secondary spectrum under a condition that the calculated background intensity is included at the second energy position.

According to claim 5, there is provided an X-ray fluorescence spectrometer including: a spectrum acquisition unit configured to irradiate a sample containing a plurality of elements with primary X-rays under different measurement conditions to acquire a plurality of spectra at least having a first peak at a first energy position; an input unit configured to receive a user's designation of a primary spectrum and a secondary spectrum having a second peak at a second energy position among the plurality of spectra; and a calculation unit configured to: perform a fitting on the first peak included in the secondary spectrum to calculate a background intensity at the second energy position due to the first peak; and perform a fitting on the first peak of the primary spectrum and perform a fitting on the second peak of the secondary spectrum under a condition that the calculated background intensity is included at the second energy position.

According to the invention of claims 1 to 5, it is possible to perform a highly accurate quantitative analysis by taking the influence of the background into consideration when the same X-ray fluorescence peak is included in the plurality of spectra, and acquiring the theoretical profile that fits the X-ray fluorescence peak included in each spectrum.

DESCRIPTION OF EMBODIMENTS

Figure 1:
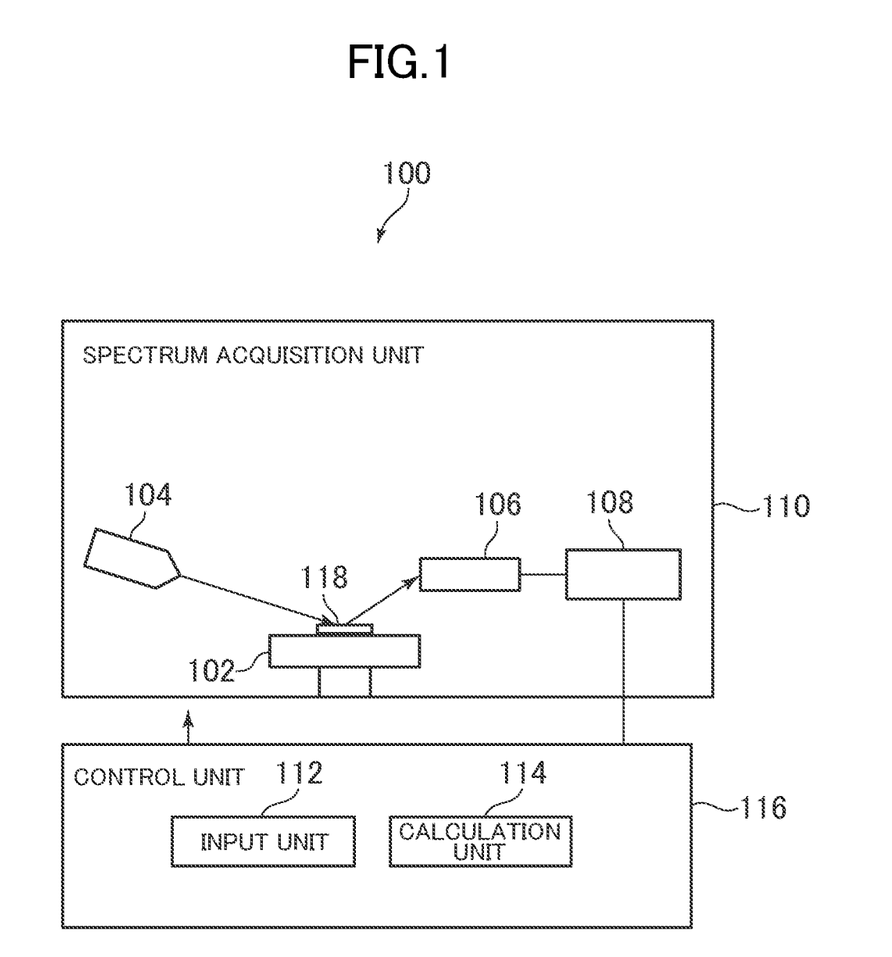
FIG. 1 is a diagram for schematically illustrating an X-ray fluorescence spectrometer according to an embodiment of the present invention.

Now, a preferred embodiment for carrying out the present invention (hereinafter referred to as "embodiment") is described. FIG. 1 is a diagram for illustrating a schematic example of an X-ray fluorescence spectrometer 100.

As illustrated in FIG. 1, the X-ray fluorescence spectrometer 100 includes: a spectrum acquisition unit 110 including a sample stage 102, an X-ray source 104, a detector 106, and a counter 108; and a control unit 116 including an input unit 112 and a calculation unit 114.

The spectrum acquisition unit 110 is configured to irradiate a sample 118 containing a plurality of elements with primary X-rays under different measurement conditions to acquire a plurality of spectra at least having a first peak at a first energy position. Specifically, the sample 118 to be analyzed is arranged on the sample stage 102. The X-ray source 104 is configured to irradiate a surface of the sample 118 with the primary X-rays. Fluorescent X-rays are emitted from the sample 118 irradiated with the primary X-rays.

The detector 106 is, for example, a detector 106 being a silicon drift detector (SDD) or another semiconductor detector. The detector 106 is configured to measure intensities of the fluorescent X-rays and scattered rays, and to output a pulse signal having pulse heights corresponding to the energy of the measured fluorescent X-rays and the energy of the scattered rays.

The counter 108 is configured to count, based on the pulse heights, the pulse signal output as the intensities measured by the detector 106. Specifically, for example, the counter 108 is a multi-channel analyzer configured to count the pulse signal output by the detector 106 for each of channels corresponding to the energy of the fluorescent X-rays and the energy of the scattered rays, and to output the count as the intensity of the fluorescent X-rays.

Figure 3:
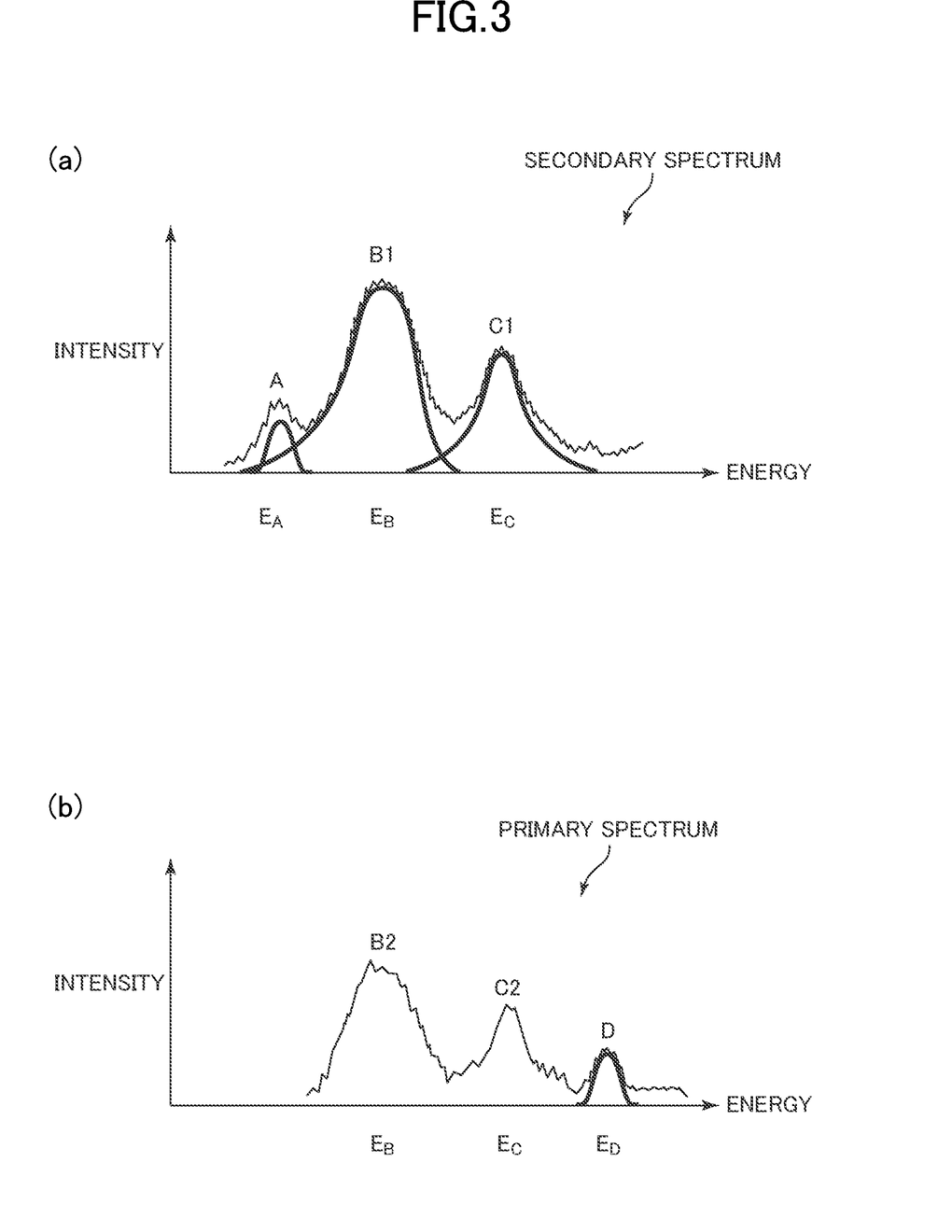
FIG. 3(a) and FIG. 3(b) are graphs for exemplarily showing a first fitting with respect to a primary spectrum and a secondary spectrum.
Figure 4:
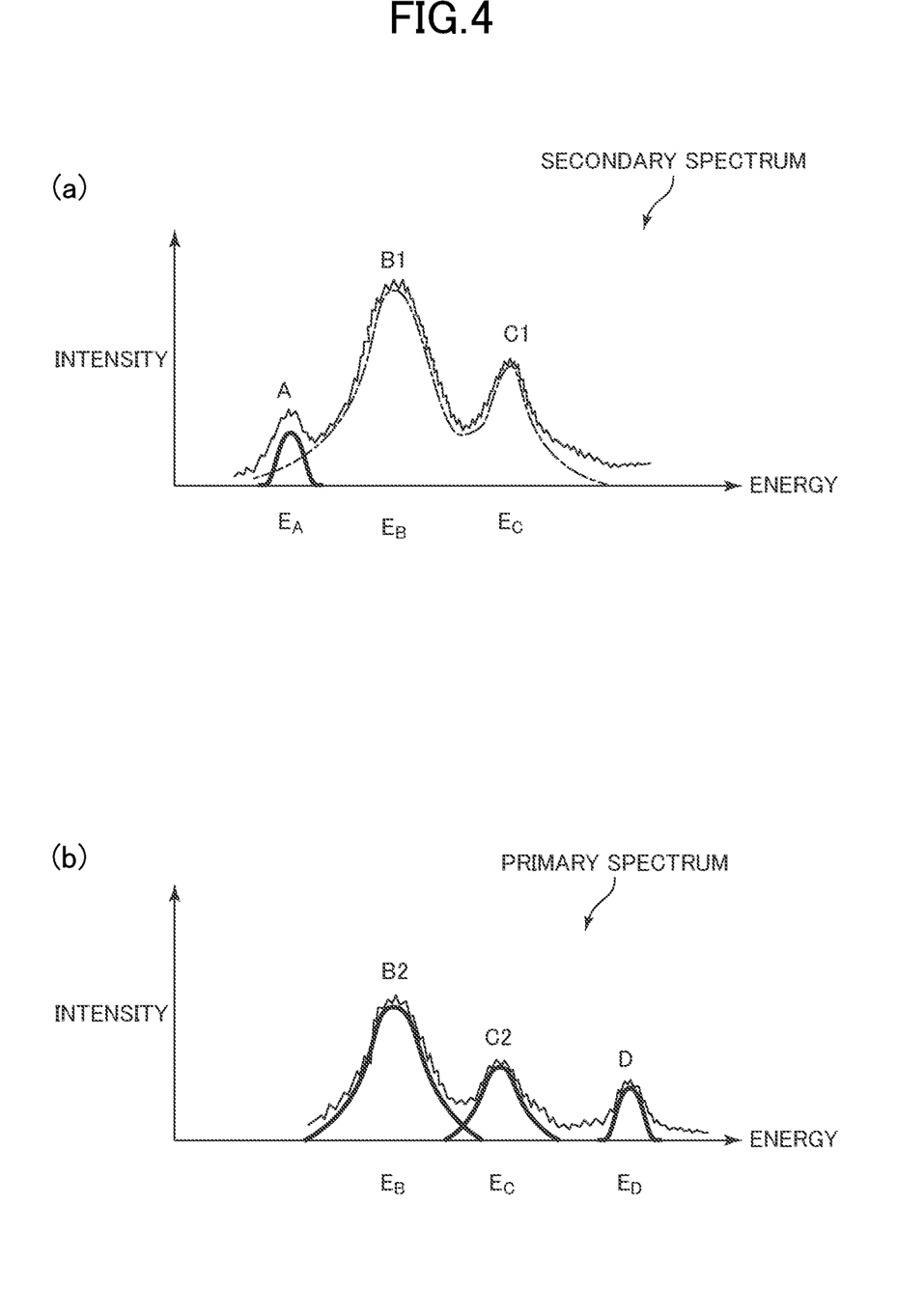
FIG. 4(a) and FIG. 4(b) are graphs for exemplarily showing a second fitting with respect to the primary spectrum and the secondary spectrum.

The spectrum acquisition unit 110 acquires the output from the counter as a spectrum. In this case, the spectrum acquisition unit 110 acquires a plurality of spectra acquired from the same sample 118 under a plurality of measurement conditions (see FIG. 3(a) and FIG. 3(b)). Examples of the measurement conditions include a type of the X-ray source 104, a tube voltage and a tube current of the X-ray source 104, an incident angle of primary X-rays, and other apparatus constants. Different spectra are acquired from the same sample 118 due to a difference in measurement conditions.

The control unit 116 is configured to control operations of the sample stage 102, the X-ray source 104, the detector 106, and the counter 108. The control unit 116 is also configured to receive a user's input to perform a quantitative analysis. Specifically, the control unit 116 is a computer included in the X-ray fluorescence spectrometer 100, and includes a storage unit (not shown) storing a program. The control unit 116 may be a computer provided outside the spectrum acquisition unit 110 and connected to the spectrum acquisition unit 110. The program is a program to be executed by a computer for use in the X-ray fluorescence spectrometer 100, and is a program for causing the computer to execute each of steps included in a quantitative analysis method described later.

The input unit 112 is configured to receive the user's designation of a primary spectrum and a secondary spectrum having a second peak at a second energy position among the plurality of spectra. The input unit 112 is, for example, a user interface including a mouse, a keyboard, and a touch panel, and is configured to receive the user's input. The user's designation is described later.

The calculation unit 114 is configured to perform a fitting on the first peak included in the secondary spectrum to calculate a background intensity at the second energy position due to the first peak. In order to improve calculation accuracy, it is desired to use as many peaks as possible, including the second peak, for the fitting. For example, it is desired that the calculation unit 114 perform a fitting on the first peak of the primary spectrum, and perform a fitting on the second peak of the secondary spectrum under a condition that the calculated background intensity is included at the second energy position, to thereby perform a quantitative analysis. A specific example of the quantitative analysis method is described with reference to FIG. 2 to FIG. 4.

Figure 2:
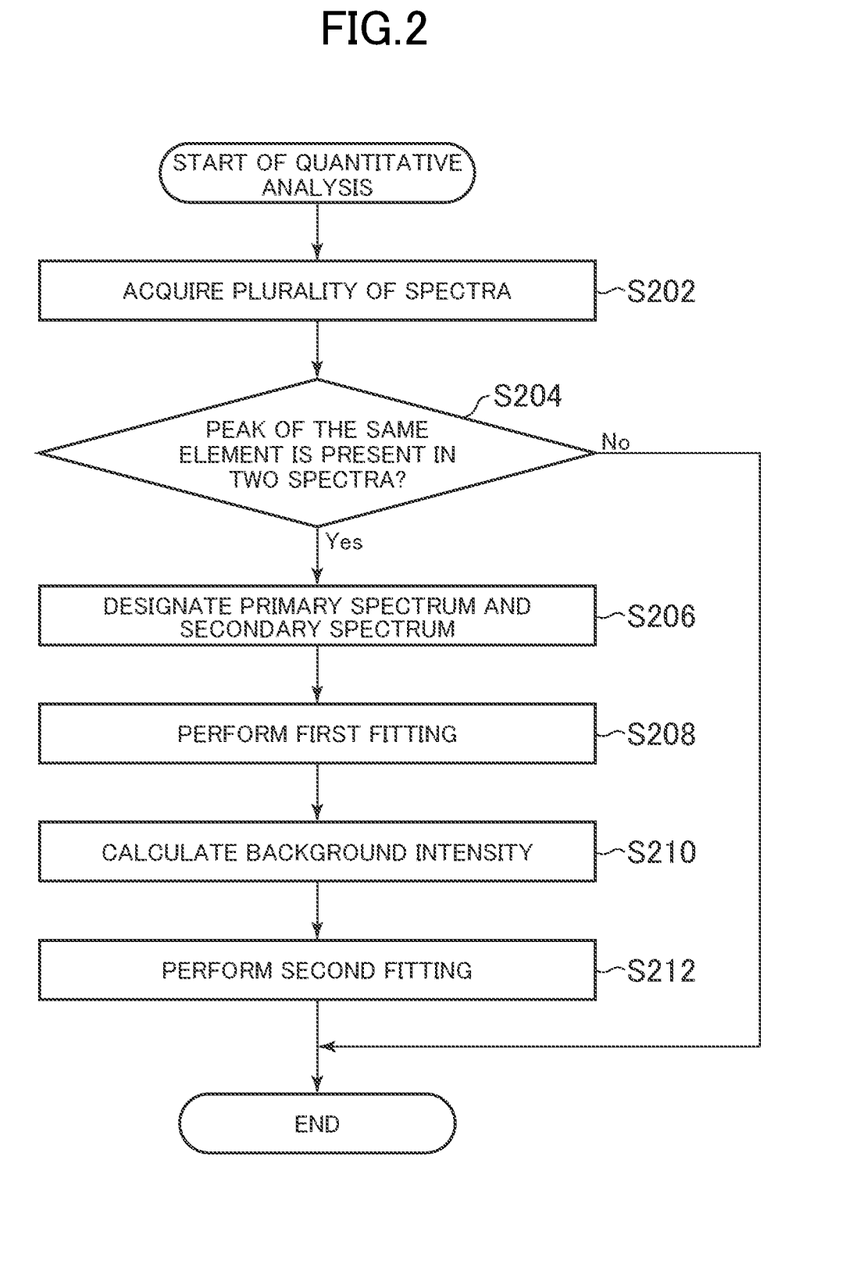
FIG. 2 is a flow chart for illustrating a flow of a quantitative analysis method.

FIG. 2 is a flow chart for illustrating a flow of the quantitative analysis method according to the present invention. First, as described above, under different measurement conditions, a plurality of spectra at least having a first peak at the first energy position are acquired from the sample 118 containing a plurality of elements (Step S202). Specifically, for example, it is assumed that spectra shown in FIG. 3(a) and FIG. 3(b) have been acquired. The spectra shown in FIG. 3(a) and FIG. 3(b) are graphs for schematically showing the spectra obtained through measurement. For the sake of simplicity of description, it is assumed that peaks at different energy positions appearing in FIG. 3(a) and FIG. 3(b) are ascribable to different elements.

The spectrum shown in FIG. 3(a) includes a peak A at an energy position $E_A$, a peak B1 at an energy position $E_B$, and a peak C1 at an energy position $E_C$. Meanwhile, the spectrum shown in FIG. 3(b) includes a peak B2 at the energy position $E_B$, a peak C2 at the energy position $E_C$, and a peak D at an energy position $E_D$. The first energy position is an energy position at which a peak appears in both the primary spectrum and at least one secondary spectrum, which are described later. In the spectra shown in FIG. 3(a) and FIG. 3(b), the first energy positions are $E_B$ and $E_C$.

From the plurality of spectra acquired in Step S202, it is understood that the sample 118 contains four elements. That is, the plurality of elements contained in the sample 118 include an element A, an element B, an element C, and an element D. The peak A is a peak ascribable to the element A. The peak B1 and the peak B2 are peaks ascribable to the element B. The peak C1 and the peak C2 are peaks ascribable to the element C. The peak D is a peak ascribable to the element D.

Subsequently, it is determined whether or not an X-ray fluorescence peak ascribable to the same element is included in the plurality of spectra acquired in Step S202 (Step S204). When it is determined that such an X-ray fluorescence peak is not included, a quantitative analysis is performed by the same method as in the related art, and this flow is brought to an end. Meanwhile, when it is determined that such an X-ray fluorescence peak is included, the procedure advances to Step S206.

Subsequently, a primary spectrum and a secondary spectrum having a second peak at the second energy position are designated from among the plurality of spectra (Step S206). Specifically, the second energy position is an energy position different from the first energy position, and is an energy position at which a peak appears in at least one secondary spectrum. The user operates the input unit 112 including a mouse, to thereby designate one primary spectrum from the plurality of spectra acquired in Step S202.

Specifically, for example, the user designates the spectrum shown in FIG. 3(b) as the primary spectrum. The spectrum shown in FIG. 3(a) is a secondary spectrum. In this case, the user selects the primary spectrum by comprehensively considering, for example, excitation efficiency of fluorescent X-rays and an overlap between peaks included in the spectra. In the spectra shown in FIG. 3(a) and FIG. 3(b), the second energy position is $E_A$.

When there are a plurality of peaks included in both the primary spectrum and the secondary spectrum, only the peaks of any one of spectra may be used in Step S206 in consideration of, for example, the excitation efficiency of fluorescent X-rays and an influence to be exerted by a tail of a peak on another peak as a background. That is, such a peak may be handled as a second peak or a third peak. Thus, it is possible to reduce a cost of calculating a theoretical profile (load on the control unit 116).

Subsequently, a first fitting is performed on the first peak and the second peak included in the secondary spectrum (Step S208). Specifically, for example, the fitting with respect to the spectrum is performed for each peak so that the theoretical profile best fits a measurement spectrum in an energy range of a full width at half maximum of each peak. In this case, the theoretical profile is expressed by adding up approximate functions for the peaks. The approximate function for each peak is formed of: a theoretical intensity calculated through use of a content of each of the elements contained in the sample 118, a physical constant, and an apparatus constant; and an appropriate function, for example, a Gaussian function representing a shape of the peak. The theoretical profile is a function using the content of each element as a parameter, and hence a content such that the theoretical profile best fits the spectrum obtained through the measurement is obtained by a least-square method.

In this case, the primary spectrum includes the peak D (third peak) at the energy position $E_D$ (third energy position). However, the secondary spectrum shown in FIG. 3(a) includes the peak A (second peak), the peak B1 (first peak), and the peak C1 (first peak), and does not include a peak ascribable to the element D (or includes too low a peak intensity to be used for the fitting). The sample 118 used for acquiring the primary spectrum and the sample 118 used for acquiring the secondary spectrum are the same sample 118, and the primary spectrum includes the peak D ascribable to the element D. Consequently, the peak D does not appear in the secondary spectrum due to a measurement condition that, for example, excitation energy of the primary X-rays is lower than energy for exciting the element D.

The fact that the secondary spectrum includes the peak A ascribable to the element A while the primary spectrum does not include the peak A ascribable to the element A is based on the following reason. The excitation energy of the primary X-rays, which is the measurement condition for the secondary spectrum, exhibits satisfactory excitation efficiency due to being closer to energy for exciting the element A than the excitation energy of the primary X-rays, which is the measurement condition for the primary spectrum. For that reason, the fitting with respect to the peak A may be performed exclusively through use of the secondary spectrum, and the peak A included in the primary spectrum may not be used for the fitting. In this case, when the primary spectrum is to be acquired, an energy range for the counting is shifted to an energy range that does not include the energy position at which the peak A appears. As a result, the primary spectrum merely does not include the peak A. The energy range to be used for the counting in the primary spectrum may be widened to include the peak A in the primary spectrum.

Meanwhile, the first fitting is performed on the premise that the total sum of the contents of all the elements contained in the sample 118 is 100%. Accordingly, the theoretical profile calculated in the first fitting also includes the content of element D as its parameter. In view of this, when there is a peak included in the primary spectrum but not included in the secondary spectrum, it is desired to perform the first fitting through use of not only the peaks included in the secondary spectrum but also some peaks included in the primary spectrum. Specifically, it is desired to perform fittings on the peak A, the peak B1, and the peak C1, which are included in the secondary spectrum, and to perform a fitting on the peak D, which is included in the primary spectrum. Thus, the fitting with respect to the secondary spectrum can be performed with a contribution of the element D being taken into consideration, to thereby be able to improve the accuracy of the first fitting.

Subsequently, the background intensity at the second energy position due to the first peak is calculated (Step S210). For example, in the step of calculating the background intensity, the background intensity at the second energy position is calculated based on the theoretical profile obtained in the first fitting. Specifically, the background intensity included in the peak A is a height of the tail of the peak B1 and the peak C1 near the energy position $E_A$. The height of the tail of the peak B1 and the peak C1 near the energy position $E_A$ (for example, in an energy range of about twice the full width at half maximum of the peak A) is calculated based on the theoretical profile acquired in Step S208. The height of the tail is stored as the background intensity.

Subsequently, a fitting is performed on the first peak of the primary spectrum, and a fitting is performed on the second peak of the secondary spectrum under the condition that the calculated background intensity is included at the second energy position (referred to as "second fitting") (Step S212). For example, in the step of performing the second fitting, the content at which the theoretical profile for the second peak of the secondary spectrum based on the calculated background intensity fits the spectrum of the second peak of the secondary spectrum and the theoretical profile for the first peak of the primary spectrum fits the spectrum of the first peak of the primary spectrum is calculated. At the same time, the content at which the theoretical profile for the third peak of the primary spectrum fits the spectrum of the third peak of the primary spectrum is calculated.

Specifically, fittings are performed on the peak B2, the peak C2, and the peak D, which are included in the primary spectrum. At the same time, the peak A ascribable to the element A having poor excitation efficiency is not used in the fitting with respect to the primary spectrum, and hence a fitting is performed on the peak A included in the secondary spectrum in the same manner as the first fitting. In this case, on the premise that the background intensity (that is, height of the tail near the energy position $E_A$) of the peak A stored in Step S210 is included as a fixed value, the fitting with respect to the peak A included in the secondary spectrum is performed. That is, the fitting is performed on the spectrum of the peak A of the secondary spectrum through use of the theoretical profile obtained by adding the approximate function for the peak A and the background intensity of the peak A stored in Step S210.

In this manner, the fitting is performed on the peak A included in the secondary spectrum and the peak B2, the peak C2, and the peak D, which are included in the primary spectrum through use of the theoretical profile using the contents of the elements A, B, C, and D as parameters, to thereby be able to calculate the contents of the elements A, B, C, and D.

As described above, even when an intensity ratio of the fluorescent X-rays is different from the apparatus constant, the quantitative analysis can be performed with stability by designating the spectrum to be used for the quantitative analysis. In addition, the analysis is performed in consideration of the background intensity, to thereby be able to obtain a highly accurate analysis result.

Description is given of an example of using the above-mentioned quantitative analysis method to measure an unknown sample 118 containing V, Cr, Mn, Fe, Co, Ni, and Cu under two measurement conditions A and B, to thereby perform a quantitative analysis on the unknown sample 118. An exciting line (primary X-ray) under the measurement condition A is a Cu-Kα line (8.046 keV), and it is possible to excite a K-line of an element lighter than Ni. An exciting line (primary X-ray) under the measurement condition B is a Mo-Kα line (17.48 keV), and it is possible to excite a K-line of an element lighter than Zr.

First, in Step S202, a spectrum A is acquired under the condition of the measurement condition A, and a spectrum B is acquired under the condition of the measurement condition B. In accordance with the above-mentioned measurement conditions, the spectrum A includes K-lines of V, Cr, Mn, Fe, and Co, and the spectrum B includes K-lines of V, Cr, Mn, Fe, Co, Ni, and Cu. In Step S204, the spectrum A and the spectrum B both include peaks ascribable to V, Cr, Mn, Fe, and Co, and hence the procedure advances to Step S206.

In Step S206, the user designates the spectrum A as the primary spectrum. In a case of observing the K-line of V or Cr, the excitation efficiency is more satisfactory when the measurement condition A, in which absorption edge energy of the K-line of V or Cr is closer, is used than when the measurement condition B is used. In view of this, the peaks of V and Cr are included in both the spectrum A and the spectrum B, but the peaks of the spectrum B are not used for the quantitative analysis. In this case, the first peak corresponds to each of the peaks of Mn, Fe, and Co, the second peak corresponds to each of the peaks of Ni and Cu, and the third peak corresponds to each of the peaks of V and Cr. In the first fitting, the user designates that the fitting is to be performed through use of the peaks of V and Cr included in the spectrum A.

In Step S208, the first fitting is performed on the spectrum B, which is the secondary spectrum. Specifically, fittings are performed on the peaks of Mn, Fe, Co, Ni, and Cu in the spectrum B, which is the secondary spectrum, and at the same time, fittings are performed on the peaks of V and Cr included in the spectrum A, which is the primary spectrum, to thereby calculate the theoretical profile that fits the spectrum B. In addition, the content of each element is simultaneously calculated. Then, in Step S210, the background intensity is stored based on the calculated theoretical profile, the background intensity being the height of the tail of the peaks ascribable to Mn, Fe, and Co at the energy position of the peak ascribable to an element other than Mn, Fe, and Co.

In Step S212, fittings are performed on the peaks of V, Cr, Mn, Fe, and Co in the spectrum A, which is the primary spectrum, and at the same time, fittings are performed on the peaks of Ni and Cu in the spectrum B, which is the secondary spectrum. In this case, on the premise that the background intensity ascribable to the stored peaks of Mn, Fe, and Co is included as a fixed value, the fitting with respect to the peaks of Ni and Cu of the spectrum B, which is the secondary spectrum, is performed. The content of each element is a parameter of the theoretical profile, and hence the contents of the elements V, Cr, Mn, Fe, Co, Ni, and Cu can be calculated by calculating the theoretical profile that fits the spectrum A and the spectrum B.

The present invention is not limited to the above-mentioned embodiment and modification examples, and can be variously modified. The above-mentioned configurations and method are merely one example, and the present invention is not limited thereto. The above-mentioned configurations and method may be replaced by substantially the same configurations as those described in the above-mentioned embodiment, those exhibiting the same action and effect, or those achieving the same object.

For example, the above description is directed to the case in which two spectra are acquired, but the number of spectra to be acquired may be three or more. In this case, the user designates one primary spectrum, and the other spectra are secondary spectra. A theoretical profile is calculated for each of the other secondary spectra, and a given peak included in each of the secondary spectra and a background intensity of the given peak are stored. Then, when a fitting with respect to a peak of the primary spectrum is to be performed, a fitting is performed on a peak of each secondary spectrum under a condition that each background intensity calculated for each secondary spectrum is included in the given peak. With this configuration, even when the number of spectra to be acquired is three or more, it is possible to perform a highly accurate quantitative analysis.

REFERENCE SIGNS LIST

100 X-ray fluorescence spectrometer, 102 sample stage, 104 X-ray source, 106 detector, 108 counter, 110 spectrum acquisition unit, 112 input unit, 114 calculation unit, 116 control unit, 118 sample

The invention claimed is:

1. A quantitative analysis method, which is performed by an X-ray fluorescence spectrometer, the quantitative analysis method comprising:
   a step of acquiring a plurality of spectra at least having a first peak at a first energy position from a sample containing a plurality of elements under different measurement conditions;
   a step of designating, from among the plurality of spectra, a primary spectrum and a secondary spectrum having a second peak at a second energy position;
   a first fitting step of performing a fitting on the first peak included in the secondary spectrum to calculate a background intensity at the second energy position due to the first peak; and
   a second fitting step of performing a fitting on the first peak of the primary spectrum and performing a fitting on the second peak of the secondary spectrum under a condition that the calculated background intensity is included at the second energy position;
   wherein the first fitting step and the second fitting step are used to determine a content of each element contained in the sample.

2. The quantitative analysis method according to claim 1, wherein the plurality of elements include a first element that generates the first peak and a second element that generates the second peak,
   wherein the first fitting step includes calculating a content of the first element and calculating the background intensity at the second energy position based on the content of the first element, and
   wherein the second fitting step includes calculating a content at which a theoretical profile for the second peak of the secondary spectrum based on the calculated background intensity fits a spectrum of the second peak of the secondary spectrum, and a theoretical profile for the first peak of the primary spectrum fits a spectrum of the first peak of the primary spectrum.

3. The quantitative analysis method according to claim 1, wherein the primary spectrum further includes a third peak at a third energy position, and
   wherein the second fitting step includes calculating a content at which a theoretical profile for the third peak of the primary spectrum fits a spectrum of the third peak of the primary spectrum.

4. A non-transitory computer-readable information storage medium for storing a program for causing a computer used for an X-ray fluorescence spectrometer to execute:
   a step of acquiring a plurality of spectra at least having a first peak at a first energy position from a sample containing a plurality of elements under different measurement conditions;
   a step of designating, from among the plurality of spectra, a primary spectrum and a secondary spectrum having a second peak at a second energy position;
   a first fitting step of performing a fitting on the first peak included in the secondary spectrum to calculate a background intensity at the second energy position due to the first peak; and
   a second fitting step of performing a fitting on the first peak of the primary spectrum and performing a fitting on the second peak of the secondary spectrum under a condition that the calculated background intensity is included at the second energy position;
   wherein the first fitting step and the second fitting step are used to determine a content of each element contained in the sample.

5. An X-ray fluorescence spectrometer, comprising:
   a spectrum acquisition unit configured to irradiate a sample containing a plurality of elements with primary X-rays under different measurement conditions to acquire a plurality of spectra at least having a first peak at a first energy position;
   an input unit configured to receive a user's designation of a primary spectrum and a secondary spectrum having a second peak at a second energy position among the plurality of spectra; and
   a calculation unit configured to:
     perform a fitting on the first peak included in the secondary spectrum to calculate a background intensity at the second energy position due to the first peak; and
     perform a fitting on the first peak of the primary spectrum and perform a fitting on the second peak of the secondary spectrum under a condition that the calculated background intensity is included at the second energy position.

* * * * *